(12) United States Patent
Sakurada et al.

(10) Patent No.: US 11,270,535 B2
(45) Date of Patent: *Mar. 8, 2022

(54) TRUNK-SHARING SYSTEM, INFORMATION PROCESSING DEVICE FOR TRUNK-SHARING, INFORMATION PROCESSING METHOD FOR TRUNK-SHARING, AND RECORDING MEDIUM HAVING PROGRAM STORED THEREIN

(71) Applicant: TOYOTA JIDOSHA KABUSHIKI KAISHA, Toyota (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Suginami-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,810

(22) Filed: Jul. 21, 2020

(65) Prior Publication Data
US 2020/0349784 A1 Nov. 5, 2020

Related U.S. Application Data

(63) Continuation of application No. 16/177,832, filed on Nov. 1, 2018, now Pat. No. 10,755,502.

(30) Foreign Application Priority Data

Dec. 28, 2017 (JP) .............................. JP2017-255028

(51) Int. Cl.
*G07C 9/00* (2020.01)
*B60R 25/01* (2013.01)
(Continued)

(52) U.S. Cl.
CPC .......... *G07C 9/00309* (2013.01); *B60R 25/01* (2013.01); *B60R 25/241* (2013.01);
(Continued)

(58) Field of Classification Search
CPC .......... G07C 9/00; G06F 17/00; G06Q 99/00; G07B 15/00; B60R 9/00; B60R 25/24;
(Continued)

(56) References Cited

U.S. PATENT DOCUMENTS 7,432,796 B2 10/2008 Kawamura
8,880,239 B2 11/2014 Kleve
(Continued)

FOREIGN PATENT DOCUMENTS

CN 103971313 A 8/2014
CN 106166998 A 11/2016
(Continued)

*Primary Examiner* — Nam V Nguyen
(74) *Attorney, Agent, or Firm* — Oblon, McClelland, Maier & Neustadt, L.L.P.

(57) ABSTRACT

A trunk-sharing system that controls an user's authority to use a predetermined area of a vehicle by issuing a predetermined authentication information to a user terminal, the trunk-sharing system including a server configured to: acquire a first information on a permission of using the predetermined area of the vehicle from a first user who owns the vehicle; provide the first information such that the first information acquired from the first user of each of a plurality of vehicles is able to be detected by a second user other than the first user; acquire a second information on a request for a use of the predetermined area which is an information from the second user who has accessed the provided first information; and issue an authentication information for locking and unlocking the predetermined area to a terminal of the second user based on the first information and the second information.

18 Claims, 14 Drawing Sheets

(51) Int. Cl.
  *B60R 25/24* (2013.01)
  *G07C 9/20* (2020.01)
  *G07C 9/21* (2020.01)

(52) U.S. Cl.
  CPC .......... *G07C 9/00896* (2013.01); *G07C 9/21* (2020.01); *G07C 9/215* (2020.01); *G07C 2009/00468* (2013.01)

(58) Field of Classification Search
  CPC ......... B60R 25/20; H04W 4/02; G08G 1/123; G05B 19/00
  USPC ............. 340/5.61, 5.7, 5.71; 455/420–422.1; 705/5, 1.1, 27.1
  See application file for complete search history.

(56) References Cited

U.S. PATENT DOCUMENTS

| | | | |
|---|---|---|---|
| 9,120,452 B2 | 9/2015 | Nishimoto | |
| 9,449,449 B2 | 9/2016 | Evans | |
| 9,508,204 B2 * | 11/2016 | Oz | H04L 63/08 |
| 9,783,162 B2 * | 10/2017 | Hoyos | B60R 25/25 |
| 9,875,589 B1 | 1/2018 | Buttolo | |
| 9,942,754 B2 | 4/2018 | Fokkelman | |
| 10,162,347 B2 * | 12/2018 | Shim | B60R 25/25 |
| 10,382,412 B2 | 8/2019 | Fujiwara | |
| 10,384,643 B2 | 8/2019 | Pudar | |
| 10,384,644 B2 * | 8/2019 | Pudar | G07C 9/00571 |
| 10,755,502 B2 * | 8/2020 | Sakurada | G07C 9/00896 |
| 2011/0213629 A1 | 9/2011 | Clark | |
| 2015/0332531 A1 | 11/2015 | Davidsson | |
| 2017/0017920 A1 | 1/2017 | Stark et al. | |
| 2017/0249791 A1 | 8/2017 | Woo | |
| 2017/0301167 A1 | 10/2017 | Thooris | |
| 2017/0352210 A1 | 12/2017 | Maiwand | |
| 2017/0352215 A1 | 12/2017 | Maiwand | |
| 2018/0357846 A1 * | 12/2018 | Chen | G07C 9/00571 |
| 2019/0009747 A1 | 1/2019 | Guo | |
| 2019/0147679 A1 * | 5/2019 | Suzuki | H04W 12/0433 340/5.72 |
| 2019/0180545 A1 | 6/2019 | Tsujimura | |

FOREIGN PATENT DOCUMENTS

| | | |
|---|---|---|
| CN | 107392546 A | 11/2017 |
| JP | 2006-206225 | 8/2006 |
| JP | 2006-262184 A | 9/2006 |
| JP | 2010-213185 A | 9/2010 |
| JP | 2012-48461 A | 3/2012 |
| JP | 2014-211030 | 11/2014 |
| JP | 2015-045141 | 3/2015 |

* cited by examiner

FIG. 4

| FIRST USER ID | CONTACT INFORMATION | VEHICLE NUMBER | VEHICLE MODEL | COLOR | POSITION INFORMATION | PERMISSION START TIME | PERMISSION END TIME | PERMITTED AREA | USE LIMITATIONS |
|---|---|---|---|---|---|---|---|---|---|
| S001 | 090-xxxx-yyyy | ... | ... | ... | ... | 10:00 | 16:00 | CARGO COMPARTMENT (SIZE: ...) | RAW FOOD PROHIBITED |
| S002 | 090-xxxx-yyyy | ... | ... | ... | ... | 00:00 | 24:00 | PASSENGER COMPARTMENT, CARGO COMPARTMENT (SIZE: ...) | VALUABLE PROHIBITED |
| | | | | | | | | | |

FIG. 5

| SECOND USER ID | NAME | CONTACT INFORMATION | LOCATION OF USE | USE START TIME | USE END TIME | PURPOSE | TYPE |
|---|---|---|---|---|---|---|---|
| C001 | ○○□□ | 090-xxxx-yyyy | ... | 13:00 | 15:00 | LOCKER | CLOTHING |
| C002 | ○○△△ | 090-xxxx-yyyy | ... | 17:00 | 17:30 | DRESSING ROOM | - |
| | | | | | | | |

FIG. 6

| VEHICLE ID | FIRST USER ID | SECOND USER ID | USE STATUS | USE INFORMATION | SCHEDULED USE START TIME | SCHEDULED USE END TIME |
|---|---|---|---|---|---|---|
| V001 | S001 | C001 | USE END | ... | 13:00 | 15:00 |
| V002 | S002 | C002 | DURING USE | ... | 17:00 | 17:30 |
| | | | | | | |

FIRST INFORMATION REGISTRATION SCREEN — SC1

- SC11: ID: S001
- NAME: ○○△△
- SC12
- SC13: VEHICLE NUMBER
- SC14: VEHICLE MODEL
- SC15: COLOR
- SC16: POSITION INFORMATION
- SC17: START/END TIME
- SC18: PERMITTED AREA
- SC19: SIZE
- USE LIMITATIONS
- SC20: REGISTRATION

SECOND USER TERMINAL — 200

- F41: REQUEST REGISTERING UNIT
- F42: USE REQUESTING UNIT
- F43: AUTHENTICATION PROCESSING UNIT

FIG. 11

| | | |
|---|---|---|
| SC21 | REQUEST REGISTRATION SCREEN | SC2 |
| | ID: C001 | |
| | NAME: ○○□□ | |
| SC22 | LOCATION | |
| SC23 | START/END TIME | |
| SC24 | PURPOSE | |
| SC25 | TYPE | |
| | REGISTRATION | SC26 |

FIG. 12

FIRST INFORMATION LIST

ID: C001
NAME: ○○□□

| SELECTION | LOCATION | TIME | PURPOSE | SIZE | LIMITING |
|---|---|---|---|---|---|
| ☐ | A | xx:xx-yy:yy | CARGO COMPARTMENT (LOCKER) | ... | ... |
| ■ | B | xx:xx-yy:yy | CARGO COMPARTMENT (LOCKER) | ... | ... |
| ☐ | C | xx:xx-yy:yy | CARGO COMPARTMENT (LOCKER) | ... | ... |
| ☐ | D | xx:xx-yy:yy | CARGO COMPARTMENT (LOCKER) | ... | ... |

USE

FIG. 13

USE REGISTRATION SCREEN

ID: C001
NAME: ○○□□

LOCATION: B
USE PERIOD: xx:xx – yy:yy

CONTACT INFORMATION _____

REGISTRATION

TRUNK-SHARING SYSTEM, INFORMATION PROCESSING DEVICE FOR TRUNK-SHARING, INFORMATION PROCESSING METHOD FOR TRUNK-SHARING, AND RECORDING MEDIUM HAVING PROGRAM STORED THEREIN

INCORPORATION BY REFERENCE

This application is a continuation of U.S. application Ser. No. 16/177,832, filed Nov. 1, 2018, now U.S. Pat. No. 10,755,502, which is based upon and claims the benefit of priority from Japanese Patent Application No. 2017-255028 filed on Dec. 28, 2017 the entire contents of each of which are incorporated herein by reference.

BACKGROUND

1. Technical Field

The disclosure relates to a trunk-sharing system, an information processing device for trunk-sharing, an information processing method for trunk-sharing, and a non-transitory computer-readable recording medium having a program stored therein.

2. Description of Related Art

A technique for allowing a receiver to register a baggage-receiving vehicle at which the receiver will receive a delivery object and enabling the receiver to receive the delivery object even when the receiver is absent by accommodating the delivery object in a trunk of the registered baggage-receiving vehicle has been proposed (for example, see Japanese Unexamined Patent Application Publication No. 2006-206225 (JP 2006-206225 A)).

Japanese Unexamined Patent Application Publication No. 2014-211030 (JP 2014-211030 A) discloses a technique of unlocking a safe based on a result of authentication of biometric information of an unlocking person.

SUMMARY

It is conceivable that a cargo compartment of a vehicle be used for pickup and delivery of a delivery object and is also used as a locker in which baggage or the like is temporarily stored. However, in the technique based on the related art in which a cargo compartment of a vehicle is used for pickup and delivery of a delivery object, use permission information for a cargo compartment of a vehicle indicating whether a third party is permitted to use the cargo compartment of the vehicle is information from an owner of the vehicle which is known to only a deliverer (a delivery company) and thus a third party cannot acquire use permission information of the cargo compartment of the vehicle. Therefore, there is demand for allowing a third party to easily ascertain a vehicle of which a cargo compartment or the like is permitted to be used and realizing sharing of a cargo compartment of a vehicle or the like (in other words, trunk-sharing) without impairing convenience for a user.

The disclosure provides a technique capable of improving convenience for a user when a cargo compartment of a vehicle or the like is shared.

An aspect of the disclosure relates to a trunk-sharing system that controls an authority of a user, which is an authority for using a predetermined area of a vehicle, by issuing a predetermined authentication information to a user terminal of the user, the trunk-sharing system including a server configured to: i) acquire a first information on a permission of using the predetermined area of the vehicle from a first user who owns the vehicle; ii) provide the first information such that the first information acquired from the first user of each of a plurality of vehicles is able to be detected by a second user other than the first user; iii) acquire a second information on a request for a use of the predetermined area which is an information from the second user who has accessed the provided first information; and iv) issue an authentication information for locking and unlocking the predetermined area to a terminal of the second user based on the first information and the second information.

With this trunk-sharing system, the second user can easily acquire use permission information for a predetermined area of a vehicle by accessing the first information provided by the server. The predetermined area of a vehicle is, for example, a cargo compartment of the vehicle. The disclosure is not limited thereto, and the predetermined area of a vehicle may be a passenger compartment of the vehicle. Here, the server can provide the first information by displaying a plurality of pieces of first information as a list on the web site. The second user can transmit a request for use based on the first information displayed in a list. Such a request for use is acquired by the server.

On the other hand, in the trunk-sharing system, information on permission of use of the predetermined area can be transmitted to and received from the server only when the first user has an intention to permit use of the predetermined area of the vehicle. In other words, when the first user does not have an intention to permit use of the predetermined area of the vehicle, the server cannot acquire the first information from the first user. In this case, the server does not provide information on the first user not having an intention to permit use of the predetermined area of the vehicle. Accordingly, privacy of the first user is protected as much as possible.

In the trunk-sharing system, authentication information for locking and unlocking the predetermined area is issued to the terminal of the second user based on the first information and the second information. Then, the second user can unlock the predetermined area using the issued authentication information and accommodate baggage or the like in the predetermined area. The second user can store baggage or the like in the predetermined area by locking the predetermined area using the issued authentication information. Use of the predetermined area by the second user is temporary use and a usable period is determined in advance. Accordingly, the second user needs to take out the stored baggage or the like in this period. The second user can take out the baggage or the like from the predetermined area by unlocking the predetermined area again using the issued authentication information. A case in which a predetermined area of a vehicle is used as a locker has been described above, but the disclosure is not limited thereto.

In the trunk-sharing system, the second user who desires to use the predetermined area of the vehicle can easily acquire use permission information for the predetermined area of the vehicle, and sharing of the predetermined area of the vehicle is realized without impairing convenience for the user. That is, when sharing a predetermined area of a vehicle, it is possible to improve convenience for a user.

In the above aspect, the first information may at least include a location of the vehicle when the use of the predetermined area is permitted, a time at which a permission of the use starts, and a time at which the permission of the use ends.

According to this configuration, the second user can appropriately acquire the first information, and thus it is possible to improve convenience for a user.

The server may acquire the second information through a plurality of steps. For example, the server may first receive a request for use of the predetermined area from the second user. Then, the server may provide the first information matching the request from a plurality of pieces of first information acquired by the server. Then, when the second user transmits a request for use based on the provided first information, the server can acquire the second information. Here, the request includes, for example, a location, a start time, and an end time at which use of the predetermined area of the vehicle is desired. Accordingly, it is possible to further improve convenience for the second user. The first information or the request may include the size of the predetermined area in addition to the above-mentioned information.

The trunk-sharing system may determine whether use of the predetermined area by the second user has ended, and may notify the second user that the use end time is coming close to prompt the second user to take out the baggage or the like from the predetermined area when the use end time is coming close but use of the predetermined area by the second user has not ended.

In the above aspect, the first information may include a use limitation for limiting use in a predetermined form.

In the trunk-sharing system, the first user can limit a purpose of use of the predetermined area by the second user or a type of the baggage or the like which may be accommodated in the predetermined area. Accordingly, the second user can appropriately acquire the first information and thus it is possible to improve convenience for a user.

In the above aspect, the server may be configured to restrict unlocking of the predetermined area by a user other than the second user by permitting only unlocking of the predetermined area using the authentication information issued to the terminal of the second user after the second user who uses the predetermined area has locked and unlocked the predetermined area According to this configuration, since even the first user who is an owner of the vehicle cannot unlock the predetermined area of the vehicle, it is possible to improve security for storage of the baggage or the like.

In the above aspect, the server may be configured to notify a current position information of the vehicle to the second user when the vehicle including the predetermined area moves while the second user is using the predetermined area.

According to this configuration, since the second user can track the baggage or the like stored in the predetermined area, it is possible to restrain the baggage or the like from being lost.

In the above aspect, the server may be configured to allow the second user and the first user to communicate with each other when the vehicle including the predetermined area moves while the second user is using the predetermined area.

According to this configuration, it is possible to restrain the baggage or the like stored in the predetermined area from being lost.

Another aspect of the disclosure relates to an information processing device for trunk-sharing that controls an authority of a user, which is an authority for using a predetermined area of a vehicle, by issuing a predetermined authentication information to a user terminal of the user, the information processing device including: a first acquisition unit configured to acquire a first information on a permission of using the predetermined area of the vehicle from a first user who owns the vehicle; a provision unit configured to provide the first information such that the first information acquired from the first user of each of a plurality of vehicles is able to be detected by a second user other than the first user; a second acquisition unit configured to acquire a second information on a request for a use of the predetermined area which is an information from the second user who has accessed the first information provided from the provision unit; and an authentication information issuing unit configured to issue an authentication information for locking and unlocking the predetermined area to a terminal of the second user based on the first information and the second information.

Another aspect of the disclosure relates to an information processing method for trunk-sharing that controls an authority of a user, which is an authority for using a predetermined area of a vehicle, by issuing a predetermined authentication information to a user terminal of the user, the information processing method including: causing a server to acquire a first information on a permission of using the predetermined area of the vehicle from a first user who owns the vehicle; causing the server to provide the first information such that the first information acquired from the first user of each of a plurality of vehicles is able to be detected by a second user other than the first user; causing the server to acquire a second information on a request for a use of the predetermined area which is an information from the second user who has accessed the provided first information; and causing the server to issue an authentication information for locking and unlocking the predetermined area to a terminal of the second user based on the first information and the second information.

Another aspect of the disclosure relates to a non-transitory computer-readable recording medium storing a program for controlling an authority of a user, which is an authority for using a predetermined area of a vehicle, by issuing a predetermined authentication information to a user terminal of the user, the program causing a computer to perform a control process for a trunk-sharing system, the control process including: acquiring a first information on a permission of using the predetermined area of the vehicle from a first user who owns the vehicle; providing the first information such that the first information acquired from the first user of each of a plurality of vehicles is able to be detected by a second user other than the first user; acquiring a second information on a request for a use of the predetermined area which is an information from the second user who has accessed the provided first information; and issuing an authentication information for locking and unlocking the predetermined area to a terminal of the second user based on the first information and the second information.

The above-mentioned processes or configurations can be freely combined unless there is technical inconsistency.

According to the disclosure, it is possible to improve convenience for a user when a cargo compartment or the like of a vehicle is shared.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an example of a first information table;

FIG. 5 is a diagram illustrating an example of a second information table;

FIG. 6 is a diagram illustrating an example of a use information table;

FIG. 11 is a diagram illustrating a request registration screen;

FIG. 12 is a diagram illustrating a first information list screen;

FIG. 13 is a diagram illustrating a use registration screen;

DETAILED DESCRIPTION OF EMBODIMENTS

First Embodiment

<System Configuration>

Figure 1:
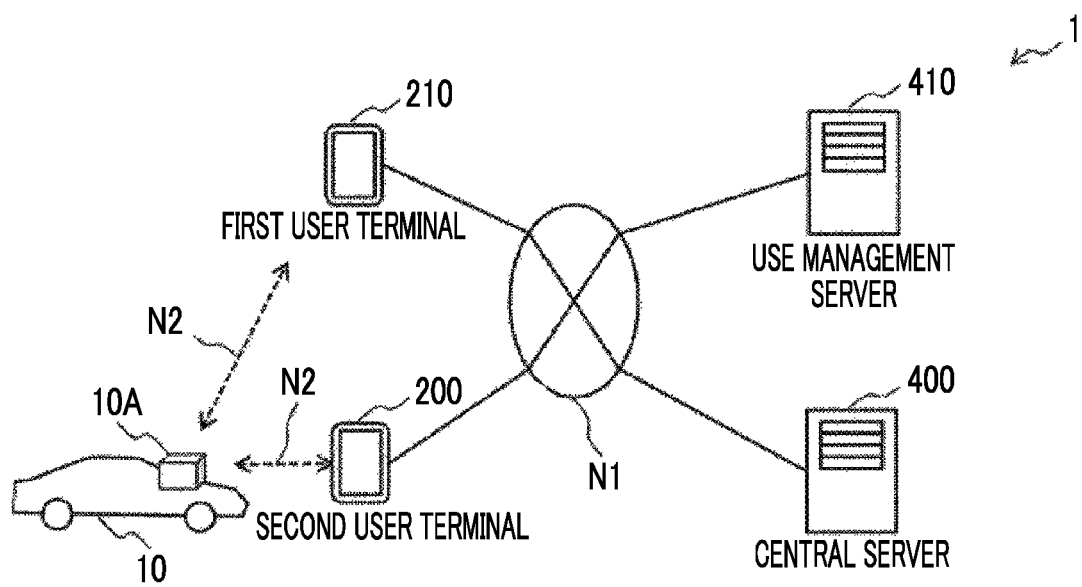
FIG. 1 is a diagram schematically illustrating a configuration of a trunk-sharing system according to an embodiment.

FIG. 1 is a diagram schematically illustrating a configuration of a trunk-sharing system according to a first embodiment. The trunk-sharing system 1 is a system that enables use of a cargo compartment (a trunk) of a vehicle 10 as a locker in which baggage or the like is temporarily stored by commonly using (sharing) the cargo compartment. In the trunk-sharing system 1, since use permission information for the cargo compartment of the vehicle 10 from a user who owns the vehicle 10 (hereinafter referred to as a first user) is provided such that the information can be searched by a third party, a user who desires use of the cargo compartment of the vehicle 10 (hereinafter referred to as a second user) and who is a user other than the first user can transmit a request for use with reference to the provided information. Trunk-sharing in this embodiment is not limited to the form of use in which a cargo compartment is used as a locker in which baggage or the like is stored, and may employ a forms of use in which baggage or the like is stored in a cargo compartment and a passenger compartment when the vehicle 10 has a body structure in which a cargo compartment and a passenger compartment are not partitioned from each other. Trunk-sharing in this embodiment is not limited to the form of use as a locker, and may employ, for example, a form of use in which a passenger compartment is used as a dressing room. Accordingly, a predetermined area of a vehicle of the disclosure may be a cargo compartment of a vehicle 10 or may be a passenger compartment thereof. When the first user does not permit use of the passenger compartment of the vehicle 10, a shared area is limited to the cargo compartment of the vehicle 10. In a vehicle 10 in which a drive recorder or the like capable of imaging a passenger compartment is installed, when the passenger compartment is used as a dressing room, settings of the drive recorder or the like may be changed in consideration of privacy of a second user.

In the example illustrated in FIG. 1, the trunk-sharing system 1 includes an onboard device 10A which is provided in the vehicle 10, a second user terminal 200, a first user terminal 210, a central server 400, and a use management server 410. The onboard device 10A, the second user terminal 200, the first user terminal 210, the central server 400, and the use management server 410 are connected to each other via a network N1. The onboard device 10A is connected to the second user terminal 200 or the first user terminal 210 via a network N2 including a short-range radio communication network.

The use management server 410 receives registration of information on permission of use of a cargo compartment (hereinafter referred to as first information) from the first user terminal 210. That is, the use management server 410 acquires first information from the first user. The first user can register the first information, for example, using an application which is installed in the first user terminal 210 and which is used for a service provided by the trunk-sharing system 1 (hereinafter referred to as a predetermined application). Here, the first information includes a location of the vehicle 10 when use of the cargo compartment is permitted, a time at which permission of use of the cargo compartment starts, a time at which permission of use of the cargo compartment ends, and the size of the cargo compartment. The first user can register such information using the predetermined application. The first information also includes identification information of the first user. The identification information of the first user is correlated in advance with the vehicle 10 which is owned by the first user in the central server 400 or the use management server 410. The identification information of the first user is registered in advance by the predetermined application. When the first user registers the first information using the predetermined application, user authentication is first performed using a password or the like before the first information is registered.

The first user can limit a purpose of use of the cargo compartment by the second user or a type of baggage or the like accommodated in the cargo compartment. In this case, the first information includes use limitations for limiting use of the cargo compartment in a predetermined form of use in addition to the above-mentioned information.

The use management server 410 receives registration of first information from a first user of each vehicle for a plurality of vehicles. Accordingly, first information of a plurality of vehicles is registered in the use management server 410.

The use management server 410 provides the first information by publishing a plurality of pieces of first information, which have been registered as described above, on the web site such that such information can be searched. The use management server 410 does not provide information of a first user who does not have an intention to permit use of a cargo compartment. Accordingly, privacy of the first user is protected as much as possible.

On the other hand, the second user can apply for use of the cargo compartment using the second user terminal 200 with reference to the provided first information. At this time, the use management server 410 acquires information on a request for use of the cargo compartment (hereinafter referred to as second information) from the second user terminal 200. The second user can transmit and receive the second information to and from the use management server 410 using a predetermined application which is installed in the second user terminal 200. When identification information of the second user is registered in advance in the use management server 410 using the predetermined application and the second user applies for use of the cargo compartment using the predetermined application, user authentication is first performed using a password or the like before the application therefor.

When the second information is acquired from the second user terminal 200, the use management server 410 transmits the first information correlated with the second information to the central server 400 along with the second information, and requests the central server 400 to transmit authentication information for locking and unlocking the vehicle 10 based on the first information to the second user terminal 200.

The central server 400 transmits authentication information for the vehicle 10 correlated with the identification information of the first user to the second user terminal 200 based on the information transmitted from the use management server 410. The second user can use the cargo compartment of the vehicle 10 by locking and unlocking the vehicle 10 using the authentication information received by the second user terminal 200. The authentication information may be transmitted from the central server 400 to the use management server 410, and may be transmitted from the use management server 410 to the second user terminal 200. Here, the authentication information is digital information which is used to allow the onboard device 10A to perform locking/unlocking of the vehicle 10 by being transmitted from the second user terminal 200 to the onboard device 10A and being subjected to an authentication process by the onboard device 10A. The locking/unlocking of the vehicle 10 is a process of locking/unlocking a door of the cargo compartment of the vehicle 10. When the disclosure is applied to a purpose for which a passenger compartment of the vehicle 10 is used as a dressing room, the locking/unlocking of the vehicle 10 is a process of locking/unlocking a door of the passenger compartment of the vehicle 10.

<Hardware Configuration>

Figure 2:
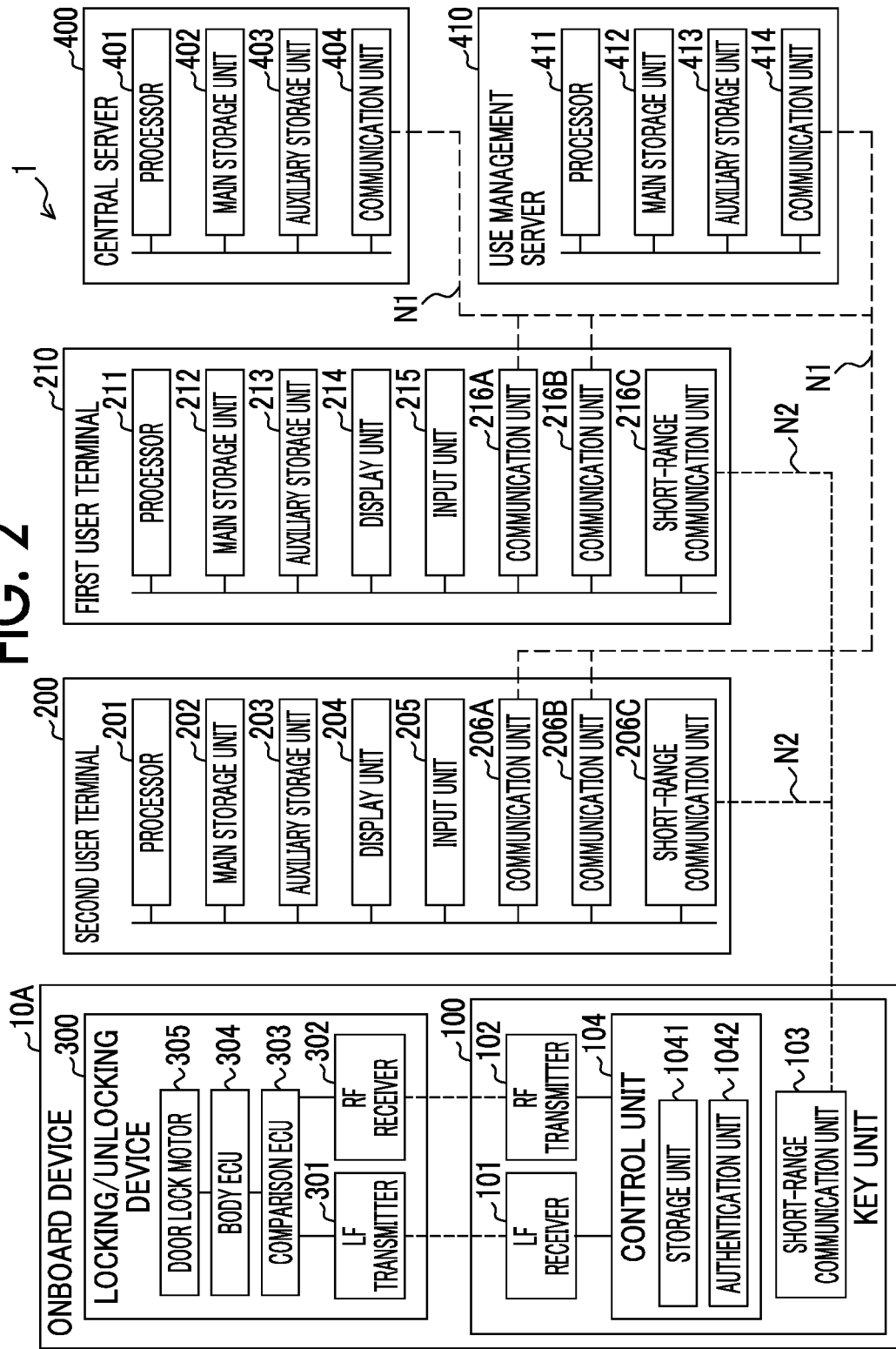
FIG. 2 is a diagram illustrating hardware configurations of an onboard device, a first user terminal, a second user terminal, a central server, and a use management server.

FIG. 2 is a diagram illustrating hardware configurations of the onboard device, the first user terminal, the second user terminal, the central server, and the use management server. In this embodiment, the disclosure is applied to a vehicle 10 which is locked and unlocked via a key unit 100 disposed in the onboard device 10A. The key unit 100 includes the same radio interface as an electronic key of a smart key, and can perform locking and unlocking of a vehicle 10 without using any physical key by communicating with an existing locking/unlocking device 300 of the onboard device 10A. The key unit 100 performs short-range radio communication with a mobile terminal such as the second user terminal 200 or the first user terminal 210 (hereinafter referred to as the second user terminal 200 or the like) and determines whether it may serve as an electronic key for the vehicle 10 based on a result of authentication for the second user terminal 200 or the like.

Authentication information which is transmitted from the second user terminal 200 or the like to the key unit 100 is compared with authentication information which is stored in advance in the key unit 100. When the authentication has succeeded, the second user terminal 200 or the like is authenticated. When the second user terminal 200 or the like is authenticated, the key unit 100 transmits an ID of an electronic key (hereinafter referred to as a key ID) for the vehicle 10 which is stored in advance in the key unit 100 and correlated with the authentication information to the locking/unlocking device 300 along with a locking/unlocking signal. The locking/unlocking device 300 locks or unlocks the vehicle 10 when the key ID received from the key unit 100 coincides with a key ID which is stored in advance in the locking/unlocking device 300. The key ID stored in advance in the key unit 100 may be encrypted with the authentication information. In this case, when the authentication for the second user terminal 200 or the like has succeeded, the key unit 100 can decrypt the key ID with the authentication information and then transmit the decrypted key ID to the locking/unlocking device 300.

The first user terminal 210 of the first user which is an owner of the vehicle 10 stores master authentication information which can be authenticated by the key unit 100, and the first user can lock and unlock the vehicle 10 at any time. On the other hand, when using the cargo compartment of the vehicle 10, the second user terminal 200 receives authentication information for locking and unlocking the vehicle 10 from the central server 400 or the use management server 410. The key unit 100 and the locking/unlocking device 300 operate with electric power which is supplied from a battery mounted in the vehicle 10.

The locking/unlocking device 300 is a device that locks and unlocks a door of a vehicle 10 and is an existing device constituting a part of a smart key system. Specifically, the user of the vehicle 10 locks and unlocks the door of the vehicle 10 in accordance with a locking signal and an unlocking signal which are transmitted from an electronic key of a smart key which is carried by the user of the vehicle 10 using radio waves of a radio frequency (hereinafter referred to as RF) band. The locking/unlocking device 300 also has a function of transmitting radio waves of a low frequency (hereinafter referred to as LF) band for searching an electronic key which is a smart key.

In this embodiment, instead of an electronic key which is a smart key which is carried by the user, the key unit 100 controls locking and unlocking of the door of the vehicle 10 by transmitting and receiving radio waves of an RF band and an LF band to and from the locking/unlocking device 300. In the following description, unless otherwise mentioned, a communication destination of the locking/unlocking device 300 is limited to the key unit 100.

The locking/unlocking device 300 includes an LF transmitter 301, an RF receiver 302, a comparison ECU 303, a body ECU 304, and a door lock motor 305. The LF transmitter 301 is means that transmits radio waves of an LF band (for example, 100 KHz to 300 KHz) for searching (polling) the key unit 100. The LF transmitter 301 is incorporated, for example, in a center console or in the vicinity of a steering wheel in the passenger compartment. The RF receiver 302 is means that receives radio waves of an RF band (for example, 100 MHz to 1 GHz) transmitted from the key unit 100. The RF receiver 302 is incorporated at any position in the passenger compartment.

The comparison ECU 303 is a computer that performs control for locking and unlocking the door of the vehicle 10 based on a signal (a locking signal or an unlocking signal)

transmitted from the key unit 100 using radio waves of an RF band. The comparison ECU 303 is constituted, for example, by a microcomputer. In the following description, the locking signal and the unlocking signal are collectively referred to as a locking/unlocking signal. The term, locking/unlocking signal, represents at least one of the locking signal and the unlocking signal.

The comparison ECU 303 authenticates whether the locking/unlocking signal transmitted from the key unit 100 is transmitted from a rightful device. Specifically, the comparison ECU 303 determines whether the key ID included in the locking/unlocking signal coincides with a key ID stored in advance in a storage unit of the comparison ECU 303. Then, the comparison ECU 303 transmits an unlocking command or a locking command to the body ECU 304 based on the authentication result. The unlocking command or the locking command is transmitted via an onboard network such as a controller area network (CAN).

The body ECU 304 is a computer that executes body control of the vehicle 10. The body ECU 304 has a function of unlocking and locking the door of the vehicle 10 by controlling the door lock motor 305 based on the unlocking command or the locking command received from the comparison ECU 303. The door lock motor 305 is an actuator that locks and unlocks the door of the vehicle 10 (which includes a trunk door in addition to a boarding door or a rear gate). The door lock motor 305 operates based on a signal transmitted from the body ECU 304. The comparison ECU 303 and the body ECU 304 may be may be embodied as a single body.

The key unit 100 will be described now. The key unit 100 is a device that is disposed at a predetermined position (for example, inside a glove box) of the passenger compartment of the vehicle 10. The key unit 100 has a function of authenticating the second user terminal 200 or the like by performing short-range radio communication with the second user terminal 200 or the like and a function of transmitting the locking/unlocking signal using radio waves of an RF band based on the authentication result. The key unit 100 includes an LF receiver 101, an RF transmitter 102, a short-range communication unit 103, and a control unit 104.

The LF receiver 101 is means that receives a polling signal which is transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the key unit 100 using radio waves of an RF band.

The short-range communication unit 103 is means that communicates with the second user terminal 200 or the like carried by the user. The short-range communication unit 103 performs communication in a short range (at a distance at which communication can be performed between the interior and the exterior of the vehicle) using a predetermined radio communication standard.

In this embodiment, the short-range communication unit 103 performs data communication based on a Bluetooth (registered trademark) Low Energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but other radio communication standards can also be used. For example, near field communication (NFC), ultra-wideband (UWB), and WiFi (registered trademark) may be used.

The control unit 104 is a computer that performs short-range radio communication with the second user terminal 200 or the like via the short-range communication unit 103 and performs control for authenticating the second user terminal 200 or the like and control for transmitting a locking/unlocking signal based on the authentication result. The control unit 104 is constituted, for example, by a microcomputer.

The control unit 104 includes a storage unit 1041 and an authentication unit 1042. A control program for controlling the key unit 100 is stored in the storage unit 1041. The control unit 104 may realize various functional units including the authentication unit 1042 by causing a CPU (not illustrated) to execute the control program stored in the storage unit 1041. For example, the control unit 104 realizes a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the second user terminal 200 or the like which is performed by the short-range communication unit 103, and a function of generating a locking/unlocking signal when authentication of the second user terminal 200 or the like by the authentication unit 1042 has succeeded.

The authentication unit 1042 authenticates the second user terminal 200 or the like based on authentication information included in a locking request or an unlocking request (hereinafter collectively referred to as a locking/unlocking request) transmitted from the second user terminal 200 or the like. Specifically, the authentication unit 1042 compares the authentication information transmitted from the second user terminal 200 or the like with the authentication information stored in the storage unit 1041 and determines that the authentication has succeeded when they satisfy a predetermined relationship. When both pieces of authentication information do not satisfy the predetermined relationship, the authentication unit 1042 determines that the authentication has failed. Here, the predetermined relationship includes a case in which the authentication information stored in the storage unit 1041 coincides with the authentication information transmitted from the second user terminal 200 or the like, a case in which results of predetermined processes such as encryption and decryption using the two pieces of authentication information coincide with each other, and a case in which a result of decryption on one of the two pieces of authentication information coincides with that on the other thereof. When the authentication of the second user terminal 200 or the like by the authentication unit 1042 has succeeded, a locking/unlocking signal generated in response to a request received from the second user terminal 200 or the like is transmitted to the locking/unlocking device 300 via the RF transmitter 102.

The key unit 100 transmits the key ID along with the locking/unlocking signal to the locking/unlocking device 300. The key ID may be stored in the key unit 100 in a plaintext state in advance or may be stored in a state in which it is encrypted using a cipher specific to the second user terminal 200 or the like. When the key ID is stored in the encrypted state, the encrypted key ID may be decrypted using the authentication information transmitted from the second user terminal 200 or the like to acquire the original key ID.

The use management server 410 has a general configuration of a computer. The use management server 410 includes a processor 411, a main storage unit 412, an auxiliary storage unit 413, and a communication unit 414. These elements are connected to each other via a bus. The main storage unit 412 and the auxiliary storage unit 413 are computer-readable recording mediums. The hardware configuration of the computer is not limited to the example illustrated in FIG. 2, and omission, substitution, or addition of elements may be appropriately performed.

The use management server 410 can realize functions matching a predetermined purpose by causing the processor 411 to load a program stored in recording medium into a work area of the main storage unit 412 and to execute the loaded program and controlling the constituent units or the like through execution of the program.

The processor 411 is, for example, a central processing unit (CPU) or a digital signal processor (DSP). The processor 411 controls the use management server 410 and performs various information processing operations. The main storage unit 412 includes, for example, a random access memory (RAM) or a read only memory (ROM). The auxiliary storage unit 413 is, for example, an erasable programmable ROM (EPROM) or a hard disk drive (HDD). The auxiliary storage unit 413 can include a removable medium, that is, a portable recording medium. The removable medium is, for example, a universal serial bus (USB) memory or a disk recording medium such as a compact disc (CD) or a digital versatile disc (DVD).

The auxiliary storage unit 413 stores various programs, various types of data, and various tables on a recording medium in a readable and writable manner. An operating system (OS), various programs, various tables, and the like are stored in the auxiliary storage unit 413. Information stored in the auxiliary storage unit 413 may be stored in the main storage unit 412. Information stored in the main storage unit 412 may be stored in the auxiliary storage unit 413.

The communication unit 414 communicates with another device and controls communication between the use management server 410 and the other device. The communication unit 414 is, for example, a local area network (LAN) interface board and a radio communication circuit for radio communication. The LAN interface board or the radio communication circuit is connected to the network N1 such as the Internet which is a public communication network.

A sequence of processes which is performed by the use management server 410 may be performed by hardware or may be performed by software.

Similarly to the use management server 410, the central server 400 includes a processor 401, a main storage unit 402, an auxiliary storage unit 403, and a communication unit 404. The processor 401, the main storage unit 402, the auxiliary storage unit 403, and the communication unit 404 are the same as the processor 411, the main storage unit 412, the auxiliary storage unit 413, and the communication unit 414 of the use management server 410 and thus description thereof will not be repeated.

The second user terminal 200 and the first user terminal 210 are small computers such as a smartphone, a mobile phone, a tablet terminal, a personal information terminal, or a wearable computer (such as a smart watch). The first user terminal 210 may be a personal computer (PC) that is connected to the use management server 410 via the network N1 such as the Internet which is a public communication network.

The first user terminal 210 includes a processor 211, a main storage unit 212, an auxiliary storage unit 213, a display unit 214, an input unit 215, a communication unit 216A, a communication unit 216B, and a short-range communication unit 216C. The processor 211, the main storage unit 212, and the auxiliary storage unit 213 are the same as the processor 411, the main storage unit 412, and the auxiliary storage unit 413 of the use management server 410 and thus description thereof will not be repeated. The display unit 214 is, for example, a liquid crystal display (LCD) or an electroluminescence (EL) panel. The input unit 215 includes a touch panel and push buttons. The input unit 215 may include a video or image input unit such as a camera or a sound input unit such as a microphone. The communication unit 216A is a communication circuit that accesses the Internet, for example, via a mobile phone network with a base station as a terminal. The communication unit 216B is a communication circuit that accesses the Internet, for example, via a wireless or wired LAN and performs data communication with the use management server 410. The short-range communication unit 216C is a communication circuit that performs short-range communication in accordance with a predetermined communication standard. Examples of the predetermined communication standard include BLE and NFC.

Similarly to the first user terminal 210, the second user terminal 200 includes a processor 201, a main storage unit 202, an auxiliary storage unit 203, a display unit 204, an input unit 205, a communication unit 206A, a communication unit 206B, and a short-range communication unit 206C. The processor 201, the main storage unit 202, the auxiliary storage unit 203, the display unit 204, and the input unit 205 are the same as the processor 211, the main storage unit 212, the auxiliary storage unit 213, the display unit 214, and the input unit 215 of the first user terminal 210 and thus description thereof will not be repeated. The communication unit 206A is a communication circuit that accesses the Internet, for example, via a mobile phone network with a base station as a terminal. The communication unit 206B is a radio communication circuit that accesses the Internet, for example, via a wireless LAN such as WiFi. The second user terminal 200 performs data communication with the use management server 410 or the central server 400 via the communication unit 206B. The short-range communication unit 206C controls communication with the vehicle 10 in a relatively short range in accordance with a predetermined communication standard. Examples of the predetermined communication standard include BLE and NFC.

The network N1 may be, for example, a global public communication network such as the Internet, and a wide area network (WAN) or other communication networks may be employed. The network N1 may include a telephone communication network for mobile phones and the like and a wireless communication network such as WiFi. The second user terminal 200 and the first user terminal 210 can access the Internet via the telephone communication network for mobile phones and the like and a wireless communication network such as WiFi. The network N2 includes a communication network for BLE via which the second user terminal 200 and the first user terminal 210 communicate with the onboard device 10A. The second user terminal 200 and the first user terminal 210 can communicate with the onboard device 10A by BLE communication.

<Functional Configuration of Use Management Server>

Figure 3:
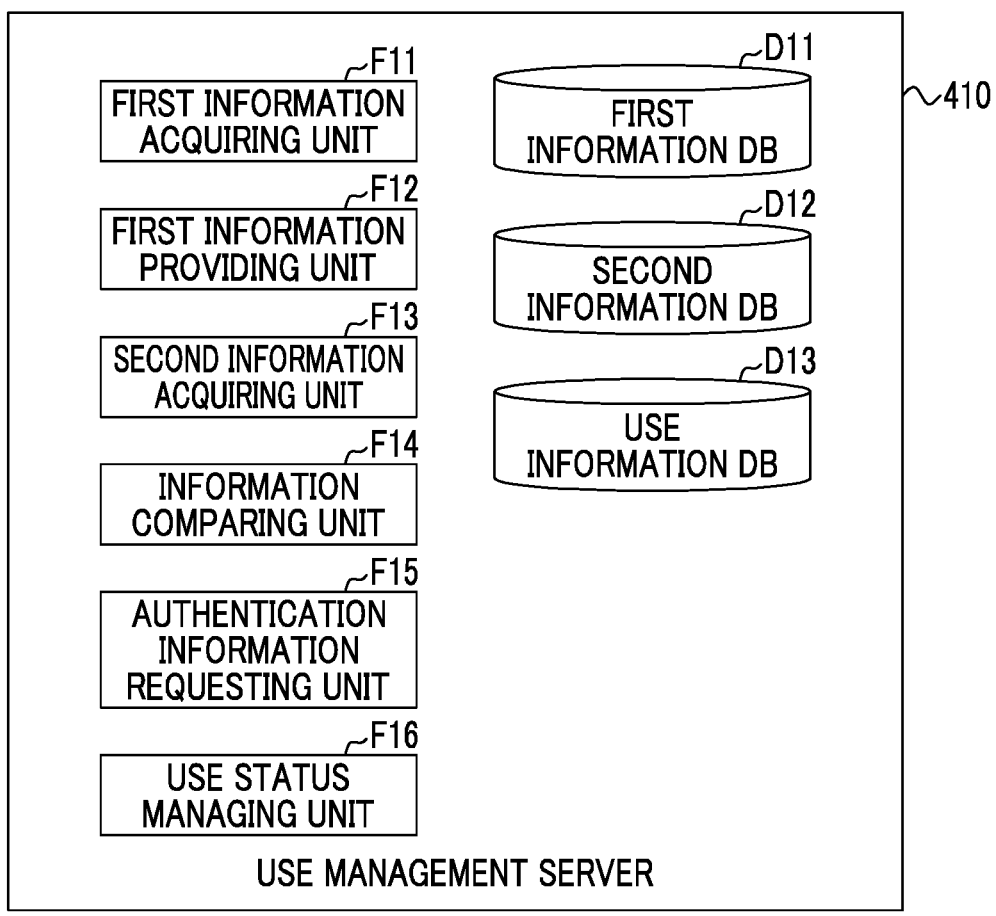
FIG. 3 is a diagram illustrating a functional configuration of the use management server.

FIG. 3 is a diagram illustrating a functional configuration of the use management server. The use management server 410 includes a first information acquiring unit F11, a first information providing unit F12, a second information acquiring unit F13, an information comparing unit F14, an authentication information requesting unit F15, a use status managing unit F16, a first information database D11, a second information database D12, and a use information database D13. The processor 411 of the use management server 410 performs processes of the first information acquiring unit F11, the first information providing unit F12, the second information acquiring unit F13, the information comparing unit F14, the authentication information requesting unit F15, and the use status managing unit F16 through a computer program in the main storage unit 412. One of the functional units or some of the processes may be embodied by a hardware circuit.

The first information database D11, the second information database D12, and the use information database D13 are constructed by causing a program of a database management system (DBMS) which is executed by the processor 411 to manage data stored in the auxiliary storage unit 413. The first information database D11, the second information database D12, and the use information database D13 are, for example, relational databases.

One of the functional units of the use management server 410 or some of the processes thereof may be embodied by the central server 400 or another computer connected to the network N1.

The first information acquiring unit F11 acquires first information from a first user of each of a plurality of vehicles. As described above, the first information includes a location of a vehicle 10 when use of a cargo compartment thereof is permitted, a time at which permission of use of the cargo compartment starts, a time at which permission of use of the cargo compartment ends, a size of the cargo compartment, and identification information of the first user. The first information may include use limitations on the purpose of use or the type of baggage or the like. The first information acquiring unit F11 registers the acquired first information in the first information database D11. The first information acquiring unit F11 functions as an example of the server of the disclosure.

The first information providing unit F12 provides a plurality of pieces of first information registered in the first information database D11 to a second user who desires to use a cargo compartment. The first information providing unit F12 publishes a list of first information (hereinafter also referred to as a first information list), for example, on a web site which is provided by the use management server 410 such that it can be searched. The second user can access the web site using the second user terminal 200 and refer to the first information list. The first information providing unit F12 functions as an example of the server of the disclosure.

The second information acquiring unit F13 acquires second information from the second user terminal 200. In this embodiment, the second information acquiring unit F13 can acquire second information through a plurality of steps. The second information acquiring unit F13 first receives a request for use of a cargo compartment from the second user. The request includes, for example, a location, a start time, and an end time in which the use of a cargo compartment is desired. The request may include a purpose of use and a type of baggage or the like.

Then, the information comparing unit F14 extracts information matching the request from the first information registered in the first information database D11. Then, the first information providing unit F12 provides the first information extracted by the information comparing unit F14 to the second user. The second information acquiring unit F13 acquires a request for use from the second user as second information based on the first information provided in this way. The second information acquiring unit F13 registers the acquired second information in the second information database D12 in correlation with identification information of the second user. The second information acquiring unit F13 functions as an example of the server of the disclosure.

The authentication information requesting unit F15 requests the central server 400 to transmit authentication information for locking and unlocking the vehicle 10 which is owned by the first user to the second user terminal 200 based on the first information and the second information.

The use status managing unit F16 acquires a use status of the cargo compartment from the second user. Alternatively, the use status managing unit F16 may acquire a use status of the cargo compartment from a predetermined device disposed in the vehicle 10. The use status managing unit F16 registers the use status of the cargo compartment in the use information database D13. Here, the use status managing unit F16 can notify the first user of the use status of the cargo compartment. The use status managing unit F16 can determine whether use of the cargo compartment by the second user has ended, and notify the second user that a use end time is coming close to prompt the second user to take the baggage or the like from the cargo compartment when the use end time is coming close but the use by the second user has not end.

The first information database D11 is a database in which the first information is stored. The first information database D11 includes a first information table illustrated in FIG. 4. Information which is stored in the first information table is not limited to the example illustrated in FIG. 4, and a field thereof can be appropriately added, changed, or deleted. The identification information of the first users may be managed by individual tables.

The first information table illustrated in FIG. 4 includes fields of first user ID, contact information, vehicle number, vehicle model, color, position information, permission start time, permission end time, permitted area, and use limitations. The first user ID is an ID for identifying a first user. The first user ID is corrected with authentication information of the vehicle 10 in advance in the central server 400. The contact information is contact information of the first user. The contact information is, for example, a mobile phone number or an e-mail address of the first user. The vehicle number, the vehicle model, and the color are information which is used for a second user to specify the vehicle 10 and are the vehicle number, the vehicle model, and the color of the vehicle 10. The first information acquiring unit F11 generates a vehicle ID for identifying the vehicle 10 based on the vehicle number of the vehicle 10. The position information is a location of the vehicle 10, and may be an address which is registered by the first user or may be an address of a destination of the vehicle 10 when the first user moves and parks the vehicle 10 at the destination. Alternatively, the position information may be position information which is calculated by a GPS device (not illustrated) disposed in the onboard device 10A by receiving signals from GPS satellites.

The permission start time is a time at which permission of use of the cargo compartment starts, and the permission end time is a time at which permission of use of the cargo compartment ends. The permitted area is an area of the vehicle 10 of which use by the second user is permitted and is a cargo compartment in this embodiment. The permitted area includes information of the size of the cargo compartment. This is only an example, and the permitted area may be a passenger compartment. The use limitations is information indicating that use in a predetermined form of use is limited, and the first user can limit the purpose of use of the cargo compartment by the second user or the type of baggage or the like accommodated in the cargo compartment. This is information indicating that storage of raw food is prohibited or information indicating that storage of valuables is prohibited as illustrated in FIG. 4.

The second information database D12 is a database in which the second information is stored. The second information database D12 includes a second information table illustrated in FIG. 5. Information which is stored in the second information table is not limited to the example illustrated in FIG. 5, and a field can be appropriately added, changed, or deleted. The identification information of the second users may be managed by individual tables.

The second information table illustrated in FIG. 5 includes fields of second user ID, name, contact information, location of use, use start time, use end time, purpose, and type. The second user ID is an ID for identifying a second user having requested use of a cargo compartment in order to receive a service provided by the trunk-sharing system 1. The name is a name of the second user having requested use of the cargo compartment. The contact information is a destination of authentication information and is, for example, a mobile phone number or an e-mail address of the second user terminal 200. The location of use is a location in which the second user desires use of the cargo compartment and is, for example, an address of the location in which use of the cargo compartment is desired (which may be an address including a street number or a house number or may be an address including a town name). The use start time and the use end time are a start time and an end time at which the second user desires use of the cargo compartment. The purpose is a purpose of use by the second user, and the cargo compartment is used as a locker in this embodiment. This is only an example, and the passenger compartment may be used as a dressing room. The type is a type of baggage or the like which is stored.

The use information database D13 is a database in which information on a use status of a cargo compartment is stored. The use information database D13 includes a use information table illustrated in FIG. 6. Information which is stored in the use information table is not limited to the example illustrated in FIG. 6, and a field can be appropriately added, changed, or deleted.

The use information table illustrated in FIG. 6 includes fields of vehicle ID, first user ID, second user ID, use status, position information of a vehicle 10, scheduled use start time, and scheduled use end time. This information is used for the above-mentioned processes which are performed by the use status managing unit F16.

<Functional Configuration of Central Server>

Figure 7:
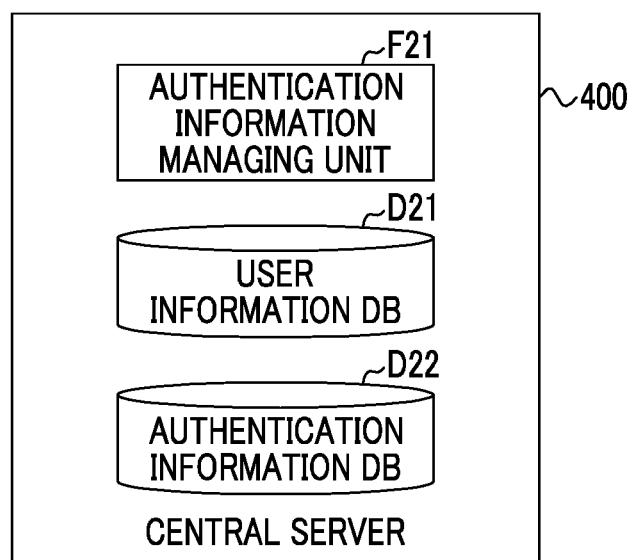
FIG. 7 is a diagram illustrating a functional configuration of the central server.

FIG. 7 is a diagram illustrating a functional configuration of the central server. The central server 400 includes an authentication information managing unit F21, a user information database D21, and an authentication information database D22 as functional units. The processor 401 of the central server 400 performs processes of the authentication information managing unit F21, the user information database D21, and the authentication information database D22 through a computer program. One of the functional units or a part of the processes may be embodied by a hardware circuit.

One of the functional units of the central server 400 or some of the processes thereof may be embodied by the use management server 410 or another computer connected to the network N1.

The authentication information managing unit F21 receives an authentication information transmission request from the use management server 410. The authentication information managing unit F21 receives information of the second user terminal 200 which is a destination of authentication information, identification information of a vehicle 10 which is locked or unlocked, and identification information of a first user correlated with the vehicle 10 along with the authentication information transmission request. The authentication information managing unit F21 transmits authentication information (terminal authentication information) corresponding to the key unit 100 of the vehicle 10 which is locked or unlocked to the second user terminal 200. The authentication information may be transmitted to the use management server 410 and then be transmitted from the use management server 410 to the second user terminal 200.

The user information database D21 stores identification information of a first user and identification information of the vehicle 10 correlated with the first user. The authentication information database D22 stores authentication information of the vehicle 10. The authentication information of the vehicle 10 is information correlated with the identification information of the vehicle 10 and can be set to be, for example, information specific to the key unit 100 of the onboard device 10A.

Here, the authentication information managing unit F21 can restrain authentication information from being double issued by not issuing the authentication information when the authentication information is already transmitted to the second user terminal 200 and is valid.

<Functional Configuration of First User Terminal>

Figure 8:
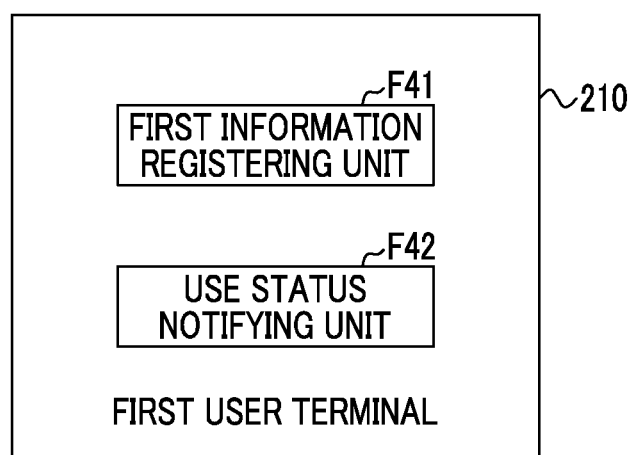
FIG. 8 is a diagram illustrating a functional configuration of the first user terminal.

FIG. 8 is a functional configuration of a first user terminal. The first user terminal 210 includes a first information registering unit F31 and a use status notifying unit F32 as functional units. The processor 211 of the first user terminal 210 performs processes of the first information registering unit F31 and the use status notifying unit F32 through a computer program in the main storage unit 212. One of the functional units or some of the processes may be performed by a hardware circuit.

The first information registering unit F31 receives an input of first information from a first user and transmits the input information to the use management server 410. The first user can register first information via a screen illustrated in FIG. 9.

Figures 9, 10:
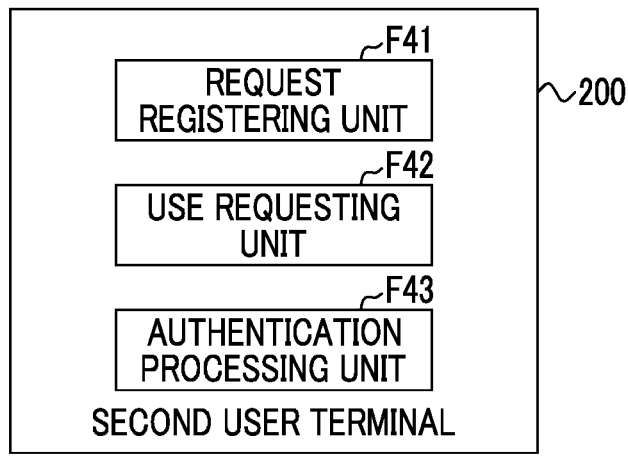
FIG. 9 is a diagram illustrating a first information registration screen.
FIG. 10 is a diagram illustrating a functional configuration of the second user terminal.

FIG. 9 is a diagram illustrating a first information registration screen. A first information registration screen SC1 is a screen which is used for a first user to register first information and is provided by a predetermined application for using a service of the trunk-sharing system 1. On the first information registration screen SC1, fields of first user information SC11 (ID and name), vehicle number SC12, vehicle model SC13, color SC14, position information SC15, permission start/end time SC16, permitted area SC17, permitted area size SC18, and use limitations SC19 and a registration button SC20 labeled with "registration" are displayed.

The first user information SC11 (ID and name) is a field for displaying information of a first user. Information of the first user is registered in advance by a predetermined application. The vehicle number SC12 is a field for inputting a vehicle number of a vehicle 10. The vehicle model SC13 and the color SC14 are fields for selecting a vehicle model and a color of the vehicle 10. The vehicle number, the vehicle model, and the color of the vehicle 10 are information which is used for a second user to specify the vehicle 10 and is transmitted to the second user terminal 200 and is thus provided to the second user. The position information SC15 is a field for inputting position information of the vehicle 10. The first user can input an address of a parking lot of the vehicle 10 as position information. Alternatively, position information which is calculated by a GPS device of the onboard device 10A by causing the first user terminal to communicate with the onboard device 10A may be automatically input to the position information SC15. The information for specifying the vehicle 10 such as the vehicle number SC12, the vehicle model SC13, the color SC14, and the position information SC15 may be registered in advance along with information of the first user. The information for specifying the vehicle 10 may be registered in advance in the user information database D21 in correlation with the identification information (the first user ID) of the first user in the central server 400. In this case, the first user can notify the second user of the information for specifying the vehicle 10 from the central server 400 by inputting the first user ID on the first information registration screen SC1.

The permission start/end time SC16 is a field for inputting a time at which permission of use of the cargo compartment starts/ends. The input item of SC16 may be selected by pull-down. The permitted area SC17 is a field for selecting an area of which use by the second user is permitted. The permitted area size SC18 is a field for inputting the size of the permitted area. The input item of SC18 may be selected by pull-down. The use limitations SC19 is a field for inputting information indicating that use in a predetermined form of use is limited. The registration button SC20 is an operation button for transmitting information selected or input on the first information registration screen SC1 as first information to the use management server 410. The use management server 410 stores the received first information in the first information database D11.

The use status notifying unit F32 illustrated in FIG. 8 acquires information of a use status from the use management server 410 and notifies the first user of the acquired information. The use status notifying unit F32 may transmit the information of a use status by an e-mail with the first user as a destination.

<Functional Configuration of Second User Terminal>

FIG. 10 is a diagram illustrating a functional configuration of a second user terminal 200. A second user terminal 200 includes a request registering unit F41, a use requesting unit F42, and an authentication processing unit F43 as the functional units. The processor 201 of the second user terminal 200 performs processes of the request registering unit F41, the use requesting unit F42, and the authentication processing unit F43 through a computer program in the main storage unit 202. One of the functional units or some of the processes may be embodied by a hardware circuit.

The request registering unit F41 receives an input of a request from a second user and transmits the input information to the use management server 410. The second user can register the request on a screen illustrated in FIG. 11.

FIG. 11 is a diagram illustrating a request registration screen. A request registration screen SC2 is a screen which is used for a second user to register a request and is provided by a predetermined application for using a service from the trunk-sharing system 1. On the request registration screen SC2, fields of second user information SC21 (ID and name), desired location SC22 for use of a cargo compartment, desired start/end time SC23 for use of a cargo compartment, purpose of use SC24, and type of baggage or the like SC25, and a registration button SC26 labeled with "registration" are displayed. The second user information is registered in advance by a predetermined application. Here, the second user can register a request for a location of use by inputting an address of a desired location for use of the cargo compartment (which may be an address including a street number or a house number or may be an address including a town name) to the location SC22. Alternatively, current position information which is calculated by a GPS device included in the second user terminal 200 by receiving signals from GPS satellites may be automatically input to the location SC22. Alternatively, the second user may register a request for a location of use by selecting a point on a map which is displayed by a map application correlated with the predetermined application.

The use requesting unit F42 displays first information, which is extracted by the information comparing unit F14 of the use management server 410 and provided by the first information providing unit F12, as a first information list illustrated in FIG. 12 on the second user terminal 200. The second user selects information from the first information list and applies for use on a use registration screen illustrated in FIG. 13. The use requesting unit F42 transmits a request for use to the use management server 410 based on the information input to the use registration screen by the second user.

FIG. 12 is a diagram illustrating a first information list screen. A first information list screen SC3 is provided by the predetermined application. On the first information list screen SC3, fields of second user information SC31 (ID and name) and first information list SC32 and a use registration button SC33 labeled with "use" are displayed. The second user information is registered in advance by the predetermined application.

The first information list SC32 includes fields of selection, location, time, purpose, size, and limiting. The field of selection is a check box for selecting a thing of which use is desired by the second user. Use registration of the checked information is performed on the use registration screen illustrated in FIG. 13. The field of location is a location of the vehicle 10 at which use of a cargo compartment is permitted. Information displayed in the field of location may be an address of the location of the vehicle 10 or an address for linking to a map application correlated with the predetermined application. When such an address is displayed, the second user can confirm the location of the vehicle 10 using the map displayed by the map application. The field of time is a time in which use of a cargo compartment is permitted. The field of purpose is information of a purpose of use. The field of size is information of the size of the cargo compartment. The field of limiting is information of use limitations. The use registration button SC33 is an operation button for transitioning to the use registration screen for performing use registration in response to the information selected on the first information list SC32. When the use registration button SC33 is pressed, the screen of the second user terminal 200 transitions to the use registration screen.

FIG. 13 is a diagram illustrating a use registration screen. The use registration screen SC5 is provided by the predetermined application. On the use registration screen SC5, fields of second user information SC51 (ID and name), location/use period SC52, and contact information SC53 and a registration button SC54 labeled with "registration" are displayed.

The field of location/use period SC52 is a field corresponding to information (location/use period) which a second user selects from the first information list SC32 in FIG. 12. The field of contact information SC53 is a field for inputting contact information of the second user. The field of contact information SC53 is, for example, a mobile phone number or an e-mail address of the second user. The registration button SC54 is an operation button which is used for the second user to perform use registration. When the registration button SC54 is pressed, the use requesting unit F42 transmits information of a request for use, that is, second information, to the use management server 410. The use management server 410 stores the received second information in the second information database D12.

When the second user uses a cargo compartment, the authentication processing unit F43 receives authentication information which is used for authentication from the key unit 100 of the vehicle 10 which is designated as the location of use. The authentication processing unit F43 provides an interface for allowing the second user to perform unlocking or locking of the vehicle 10 using the received authentication information. The second user can perform unlocking or locking of the vehicle 10, for example, by an operation on an authentication processing screen SC7 illustrated in FIG. 14.

Figure 14:
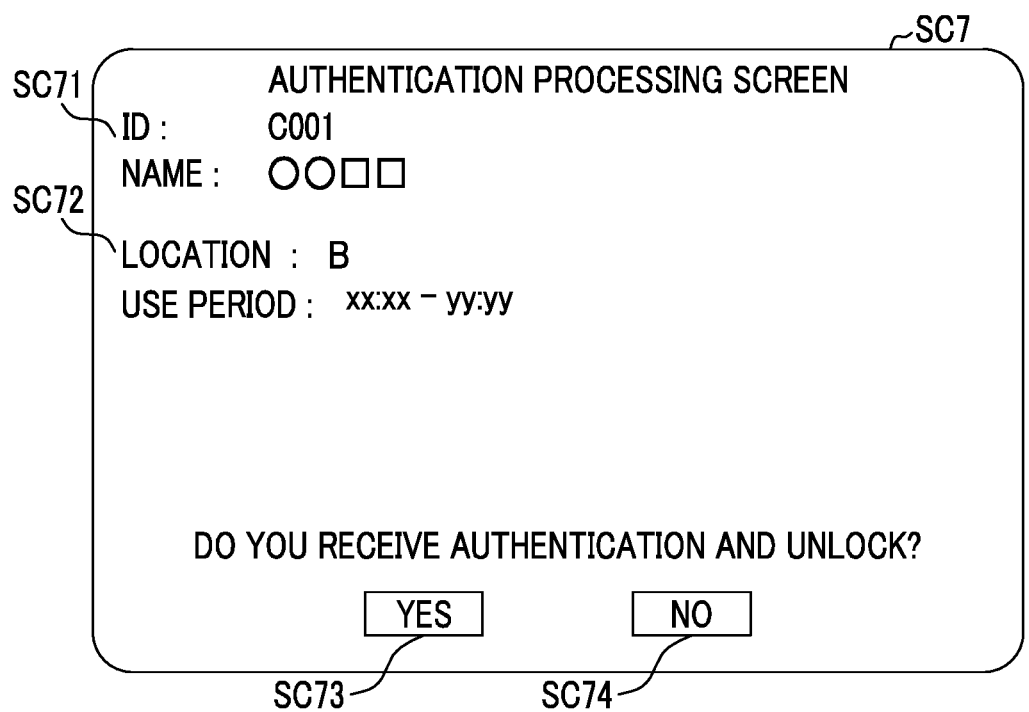
FIG. 14 is a diagram illustrating an authentication information management screen.

FIG. 14 is a diagram illustrating an authentication processing screen. The authentication processing screen SC7 illustrated in FIG. 14 is a screen for performing unlocking of the vehicle 10. On the authentication processing screen SC7, fields of second user information SC71 (ID and name) and location/use period SC72, an unlocking button SC73 labeled with "YES," and a cancel button SC74 labeled with "NO" are displayed.

When the unlocking button SC73 is pressed, the short-range communication unit 103 of the key unit 100 receives authentication information from the second user terminal 200. The authentication unit 1042 of the key unit 100 performs an authentication process by comparing the received authentication information with authentication information stored in the storage unit 1041. When the authentication has succeeded, the authentication unit 1042 of the key unit 100 transmits an unlocking signal to the locking/unlocking device 300 along with a key ID correlated with the authentication information, and the vehicle 10 is unlocked when authentication of the key ID has succeeded.

<Process Flow>

Figure 15:
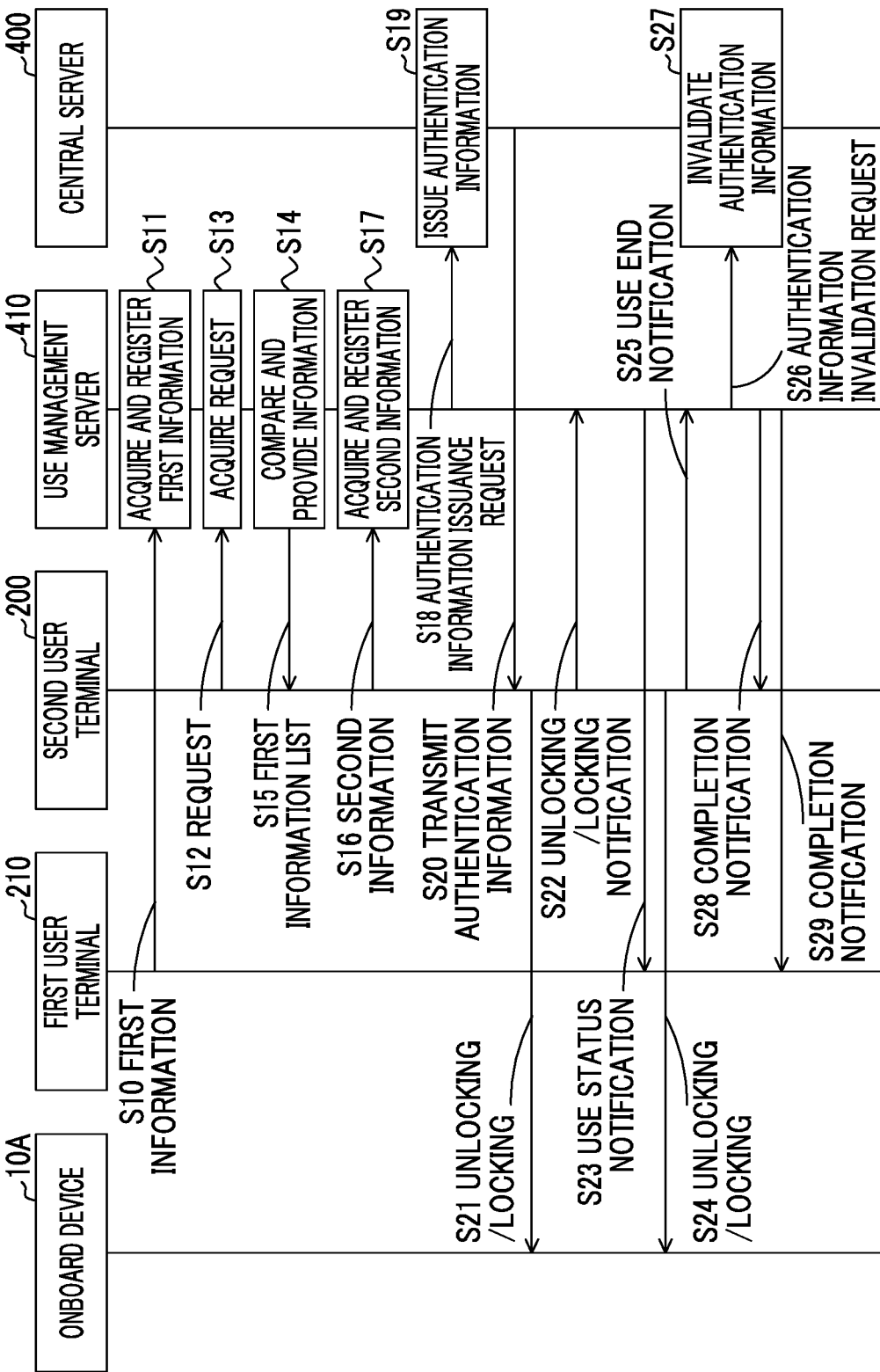
FIG. 15 is a diagram illustrating a flow of operations in a trunk-sharing system according to a first embodiment.

FIG. 15 is a diagram illustrating a flow of operations in the trunk-sharing system according to this embodiment. FIG. 15 illustrates a flow of operations in elements of the trunk-sharing system 1 and processes which are performed by the elements. Information of a first user and a second user are registered in advance by the predetermined application.

The first user inputs first information to the first user terminal 210 to register the first information. The first information is transmitted to the use management server 410 (S10). The use management server 410 registers the acquired first information in the first information database D11 (S11).

The second user inputs a request to the second user terminal 200, and the input request is transmitted to the use management server 410 (S12). When the request is acquired (S13), the use management server 410 extracts information matching the request from the first information registered in the first information database D11 and provides the extracted information to the second user (S14). Specifically, in the process of S14, a desired use time (from a desired use start time to a desired use end time) included in the request and a permitted use time (from a permitted start time to a permitted end time) included in the first information are compared with each other, and the first information including the permitted use time is extracted as information which is provided to the second user when the desired use time is included in the permitted use time. An address of a desired use location included in the request and an address of the location of the vehicle 10 included in the first information are compared with each other, and the first information including the address of the location is extracted as information which is provided to the second user, for example, when both addresses match each other in prefecture, municipality, and street number. Even when the address of the desired use location included in the request and the address of the location of the vehicle 10 included in the first information do not match in street number but a distance between points determined by the addresses is equal to or less than a predetermined distance, the first information including the address of the location may be extracted as information which is provided to the second user. Alternatively, latitude and longitude information of the desired use location included in the request and latitude and longitude information of the location of the vehicle 10 included in the first information may be compared, and the first information including the location information may be extracted as information which is provided to the second user when a distance between points determined by the information is equal to or less than a predetermined distance. The extracted information is provided as a first information list to the second user.

The second user transmits a request for use to the use management server 410 based on the first information list transmitted to the second user terminal 200 (S15). That is, second information is transmitted to the use management server 410 (S16). The use management server 410 registers the acquired second information in the second information database D12 (S17).

The use management server 410 transmits information such as the identification information of the first user and the contact information of the second user terminal 200 which is a destination of authentication information to the central server 400 and requests the central server 400 to transmit authentication information to the second user terminal 200 (S18). When the authentication information transmission request is received, the central server 400 issues authentication information based on the received identification information of the first user (S19). The central server 400 transmits the issued authentication information to the second user terminal 200 (S20).

The second user terminal 200 transmits authentication information, which has been transmitted to the second user terminal 200, to the onboard device 10A (the key unit 100) of the vehicle 10 of which the cargo compartment is used and requests the onboard device 10A for unlocking. When authentication of the second user terminal 200 using the authentication information has succeeded, the vehicle 10 is unlocked (S21). Accordingly, the second user can use the cargo compartment. Then, when baggage or the like is accommodated in the cargo compartment, the second user can lock the vehicle 10 (S21).

When the second user performs an unlocking/locking operation, the use management server 410 receives an unlocking/locking notification from the second user terminal 200 (S22). Then, the use management server 410 notifies the first user terminal 210 of a use status (S23).

When the second user takes out the baggage or the like stored in the cargo compartment after the use has ended, unlocking/locking of the vehicle 10 is performed again using the second user terminal 200 (S24). Then, the use management server 410 receives a use end notification from the second user terminal 200 (S25). When the use end notification is received, the use management server 410 requests the central server 400 to invalidate the authentication information transmitted in S20 (S26). Then, the central server 400 invalidates the authentication information (S27). The use management server 410 or the second user terminal 200 can invalidate the authentication information by deleting the authentication information received from the central server 400 in accordance with an instruction from the central server 400. The central server 400 can perform exclusive control for not double issuing authentication information or update the authentication information and notify the updated authentication information to the key unit 100 by managing whether to invalidate the authentication information. When invalidation of the authentication information is completed, a completion notification is transmitted from the use management server 410 to the first user terminal 210 and the second user terminal 200 (S28 and S29).

With the above-mentioned trunk-sharing system 1, a second user can easily acquire use permission information and sharing of a cargo compartment is realized without impairing convenience for a user. That is, it is possible to improve convenience for a user when a cargo compartment or the like of a vehicle 10 is shared.

<Recording Medium>

A program causing a computer or other machine or device (hereinafter referred to as a computer or the like) to execute the above-mentioned functions can be recorded on a recording medium which can be read by a computer or the like. By causing the computer or the like to read and execute the program on the recording medium, the functions can be provided.

Here, a recording medium which can be read by a computer or the like refers to a non-transitory recording medium which can store information such as data or programs in an electrical, magnetic, optical, mechanical, or chemical action and be read by the computer or the like. Examples of the recording medium which can be detached from the computer or the like include a flexible disk, a magneto-optical disk, a CD-ROM, a CD-R/W, a DVD, a Blu-ray disc, a DAT, an 8 mm tape, and a memory card such as a flash memory. Examples of the recording medium which is fixed to the computer or the like include a hard disk and a read only memory (ROM). A solid state drive (SSD) can be used as a recording medium which can be detached from the computer or the like and can also be used as a recording medium which is fixed to the computer or the like.

Modified Example 1 of First Embodiment

In the first embodiment, when an authentication process in the key unit 100 has succeeded, a vehicle 10 is unlocked by the locking/unlocking device 300. However, in this modified example, the locking/unlocking device 300 may perform the processes in the key unit 100. That is, the locking/unlocking device 300 may include a control unit for authenticating authentication information received from the second user terminal 200, and the control unit may transmit an unlocking command or a locking command to the body ECU 304 via an onboard network such as a CAN when authentication of the second user terminal 200 has succeeded.

With the trunk-sharing system 1 according to this modified example, sharing of a cargo compartment or the like is realized without impairing convenience for a user with a simple configuration without installing the key unit 100.

Modified Example 2 of First Embodiment

In the above-mentioned first embodiment, the second user terminal 200 receives authentication information from the central server 400, a locking/unlocking signal is transmitted from the key unit 100 to the locking/unlocking device 300 when the second user terminal 200 is authenticated based on the received authentication information, and the vehicle 10 is locked and unlocked. In this modified example, the authentication information includes information of a key ID for locking/unlocking the vehicle 10, not information for authenticating the second user terminal 200.

In this case, the second user terminal 200 receives authentication information including a key ID for locking/unlocking a vehicle 10 from the central server 400, and transmits the received key ID along with a locking/unlocking signal to the locking/unlocking device 300. The locking/unlocking device 300 compares the received key ID with a key ID stored in advance in the locking/unlocking device 300 and locks and unlocks the vehicle 10 when both key IDS coincide with each other. The key ID is transmitted and received in an encrypted state between the second user terminal 200 and the central server 400 or the locking/unlocking device 300. The authentication information managing unit F21 of the central server 400 may generate a one-time key, for example, by encrypting the key ID along with time information using a predetermined algorithm. The locking/unlocking device 300 decrypts the received one-time key using the same algorithm as in the central server 400 and compares the decrypted one-time key with the key ID stored in advance in the locking/unlocking device 300. The one-time key may be transmitted from the central server 400 to the use management server 410 and may be transmitted from the use management server 410 to the second user terminal 200.

By including the one-time key generated from the key ID and the time information in the authentication information, the central server 400 can generate authentication information which is temporarily valid for each request for use and transmit the generated authentication information to the second user terminal 200.

Modified Example 3 of First Embodiment

In the above-mentioned first embodiment and Modified Example 2 of the first embodiment, the central server 400 transmits authentication information for the second user terminal 200 corresponding to fixed authentication information specific to the key unit 100 or the key ID stored in advance in the locking/unlocking device 300 of the vehicle 10 to the second user terminal 200. However, authentication information transmitted between the second user terminal 200 and the key unit 100 is not limited thereto. In this modified example, for example, the central server 400 may generate new authentication information and issue the new authentication information to the second user terminal 200 every time a request for use is received from the second user terminal 200. In this case, the central server 400 can transmit authentication information for the key unit 100 corresponding to the new authentication information for the second user terminal 200 to the key unit 100 via an onboard communication device (not illustrated) which can communicate with the network N1 connected to the central server 400 and store the authentication information therein. In this case, the key unit 100 can be connected to the onboard communication device via the CAN or the like. Here, the central server 400 may generate new authentication information from identification information for identifying the vehicle 10 and time information and transmit the new authentication information and the time information to the second user terminal 200. In this case, the key unit 100 can generate new authentication information using the same algorithm as in the central server 400. The second user terminal 200 can transmit the new authentication information and the time information to the key unit 100 and be subjected to authentication.

Second Embodiment

In the above-mentioned first embodiment, a first user terminal 210 of a first user who is an owner of a vehicle 10 can store master authentication information which can be authenticated by the key unit 100, and the first user can lock and unlock the vehicle 10 at any time. On the other hand, in a second embodiment, only unlocking of the vehicle 10 using authentication information issued to the second user terminal 200 is permitted after use of a cargo compartment by a second user has started.

Figure 16:
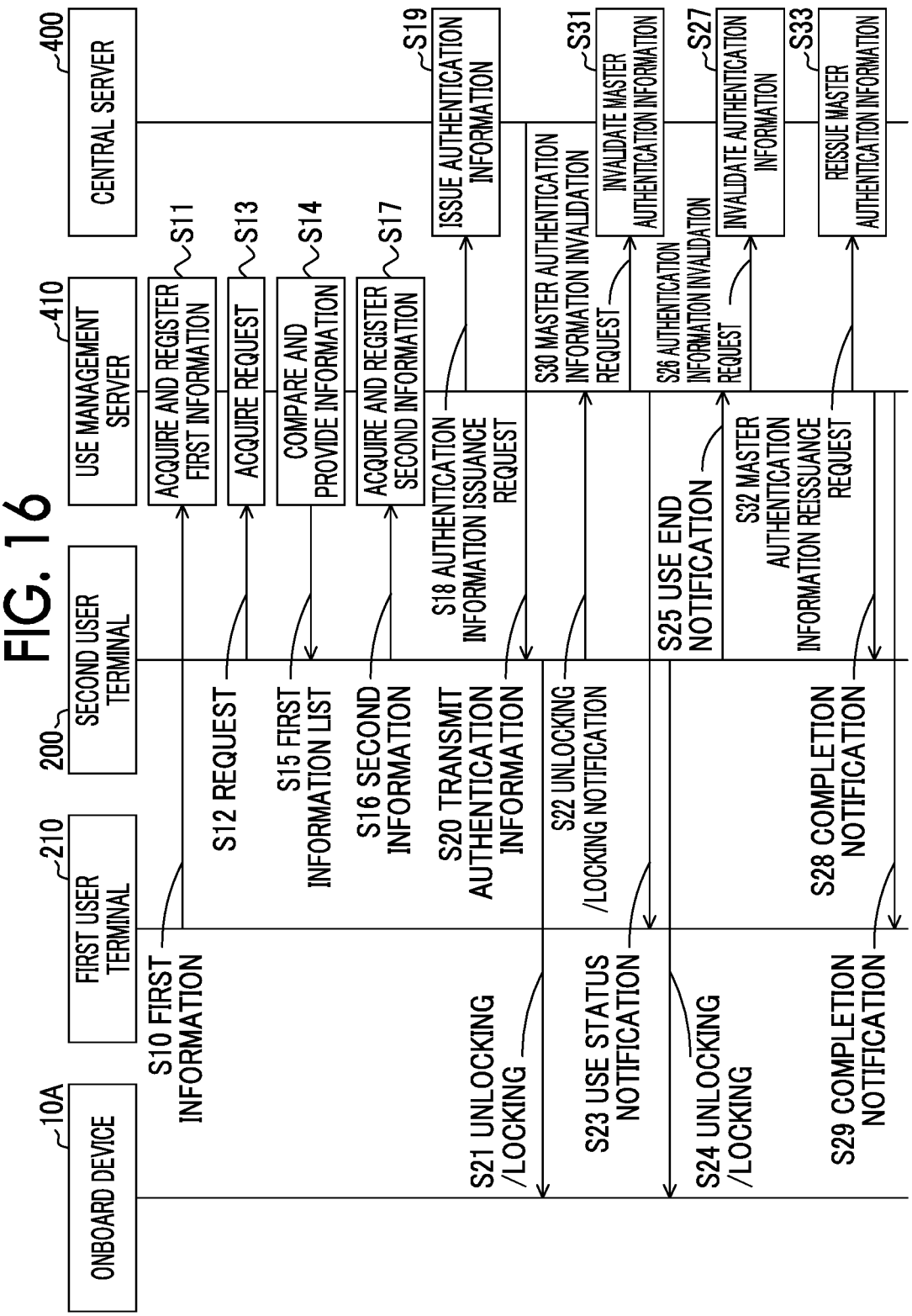
FIG. 16 is a diagram illustrating a flow of operations in a trunk-sharing system according to a second embodiment.

FIG. 16 is a diagram illustrating a flow of operations of a trunk-sharing system according to this embodiment. In the flow of operations and processes illustrated in FIG. 16, substantially the same ones as in the flow of operations and processes illustrated in FIG. 15 will be referred to by the same reference signs and detailed description thereof will not be repeated.

In the flow of operations of the trunk-sharing system illustrated in FIG. 16, when the use management server 410 receives an unlocking/locking notification from the second user terminal 200 (S22), the use management server 410 requests the central server 400 to invalidate master authentication information stored in the first user terminal 210 (S30). Then, the central server 400 temporarily invalidates the master authentication information (S31). Here, the central server 400 can invalidate the master authentication information by communicating with the first user terminal 210 and rewriting the master authentication information stored in the first user terminal 210. Alternatively, the central server 400 may communicate with the first user terminal 210 and delete the master authentication information stored in the first user terminal 210.

When the master authentication information is temporarily invalidated in this way, even the first user which is an owner of the vehicle 10 cannot unlock the vehicle 10 during invalidation of the master authentication information. In this embodiment, the central server 400 functions as an example of the server of the disclosure by temporarily invalidating the master authentication information.

Then, when the use management server 410 receives a use end notification from the second user terminal 200 (S25), the use management server 410 requests the central server 400 to reissue master authentication information (S32). Then, the central server 400 reissues the master authentication information (S33). Here, the central server 400 can reissue the master authentication information by communicating with the first user terminal 210 and restoring the master authentication information rewritten (or deleted) in S31. At this time, the same master authentication information as the original master authentication information stored in the first user terminal 210 is reissued. The disclosure is not limited thereto, and the central server 400 may issue new master authentication information to the first user terminal 210 and the key unit 100.

In the trunk-sharing system 1 according to this embodiment, since unlocking of the vehicle 10 by a user other than second user is limited, it is possible to improve security of storage of baggage or the like.

Third Embodiment

In the first embodiment, a vehicle 10 does not move while a second user is using a cargo compartment thereof. Here, when the vehicle 10 moves while the second user is using the cargo compartment, there is concern that the second user will lose baggage or the like stored in the cargo compartment. Therefore, in a third embodiment, when the vehicle 10 moves while the second user is using the cargo compartment, current position information of the vehicle is notified to the second user.

Figure 17:
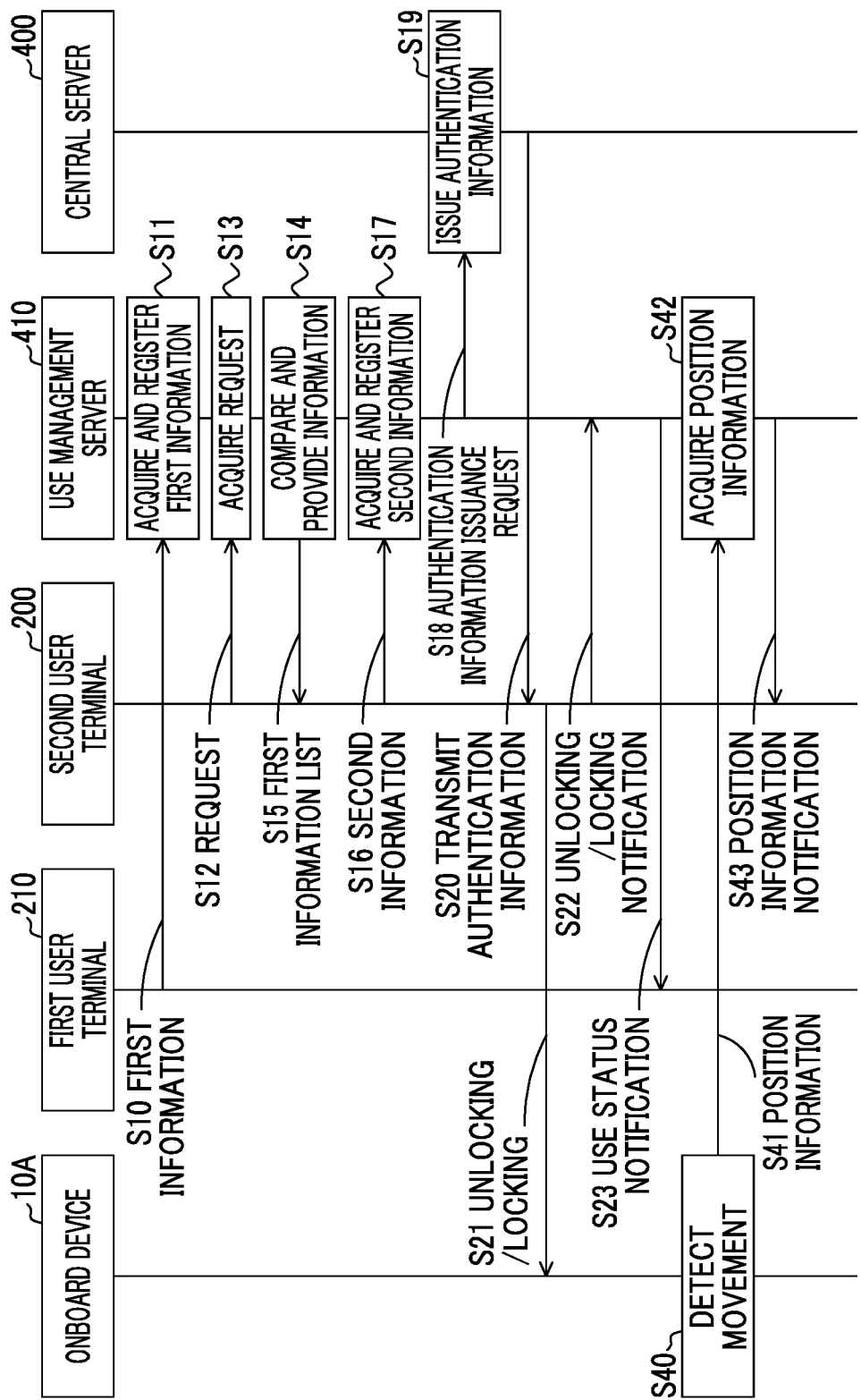
FIG. 17 is a diagram illustrating a flow of operations in a trunk-sharing system according to a third embodiment.

FIG. 17 is a diagram illustrating a flow of operations in a trunk-sharing system according to this embodiment. In the flow of operations and processes illustrated in FIG. 17, substantially the same ones as in the flow of operations and processes illustrated in FIG. 15 will be referred to by the same reference signs and detailed description thereof will not be repeated.

In the flow of operations in the trunk-sharing system illustrated in FIG. 17, the onboard device 10A detects movement of the vehicle 10 (S40). The onboard device 10A can detect movement of the vehicle 10 by receiving signals from GPS satellites via a GPS device (not illustrated) included in the onboard device 10A. Then, the onboard device 10A transmits and receives position information, which is calculated by receiving signals from the GPS satellites, to and from the use management server 410 (S41). In this way, the use management server 410 acquires position information of the vehicle 10 (S42) and notifies the acquired position information to the second user terminal 200 (S43). In this embodiment, the use management server 410 functions as an example of the server of the disclosure by notifying the position information of the vehicle 10 to the second user terminal 200.

With the above-mentioned trunk-sharing system 1, since a second user can track baggage or the like stored in a cargo compartment, it is possible to restrain the baggage or the like from being lost.

Modified Example of Third Embodiment

In this modified example, when the vehicle 10 moves while the second user is using the cargo compartment, the second user can communicate with the first user.

In this modified example, similarly to the third embodiment, movement of a vehicle 10 is detected by the onboard device 10A. In this embodiment, the onboard device 10A notifies movement of the vehicle 10 to the use management server 410. Then, the use management server 410 can enable the second user and the first user to communicate with each other, for example, through a communication system which is provided by the predetermined application. This communication system may be configured such that the second user and the first user can communicate with each other by phones or may be configured such that the second user and the first user can communicate with each other by e-mails. Alternatively, the system may be configured such that the second user and the first user can communication with each other through an operator service by causing the use management server 410 to access the operator service.

With the above-mentioned trunk-sharing system 1, it is possible to restrain baggage or the like stored in a cargo compartment from being lost.

Other Embodiments

In the trunk-sharing system 1 according to the above-mentioned embodiments and the modified examples, when a first user does not permit use of a passenger compartment of a vehicle 10, it is assumed that unlocking/locking control of only a cargo compartment door in locking and unlocking of the vehicle 10 is performed, and unlocking/locking control of a passenger compartment door is not performed but is maintained in a locked state in consideration of the security. In a vehicle 10 having a body structure in which a cargo compartment and a passenger compartment are not partitioned from each other, for example, a vehicle 10 which is called one box type, since a person can access the passenger compartment by unlocking the cargo compartment door, there is a likelihood that the first user owning the vehicle 10 will have concern about security.

Therefore, in a vehicle 10 in which the cargo compartment and the passenger compartment are not partitioned, the trunk-sharing system 1 captures a moving image of the interior using a drive recorder or the like which can also image the interior and determines whether a person invades into the passenger compartment from the cargo compartment based on the captured moving image when the cargo compartment door is open. When it is determined that a person has invaded into the passenger compartment from the cargo compartment, the trunk-sharing system 1 performs storage of the captured moving image, operation of an onboard alarm, notification to a provider, notification to the first user, and the like. On the other hand, when it is determined that a person has not invaded into the passenger compartment, the trunk-sharing system 1 may delete the captured moving image at a time point at which use of the cargo compartment by the second user has ended. The trunk-sharing system 1 may transmit the captured moving image to the first user terminal 210 regardless of whether a person has invaded into the passenger compartment as a part of a user service.

What is claimed is:

1. A server, comprising:
   circuitry programmed to:
   acquire request information on a request for a use of a predetermined area, the predetermined area being owned by a first user, the first user permitting the use of the predetermined area, and the request being issued by a second user;
   issue authentication information for locking and unlocking the predetermined area to the second user based on the request information; and
   permit only unlocking of the predetermined area using the authentication information issued to the second user after the second user has unlocked and locked the predetermined area.

2. The server according to claim 1, wherein the circuitry is configured to prohibit the locking and unlocking of the predetermined area by users other than the second user after the second user locks and unlocks the predetermined area.

3. The server according to claim 1, wherein
   the circuitry is configured to acquire information on a permission of the use of the predetermined area from the first user, and
   the information at least includes a location of the predetermined area when the use of the predetermined area is permitted, a time at which the permission of the use starts, and a time at which the permission of the use ends.

4. The sever according to claim 3, wherein the request information includes a use limitation for limiting use in a predetermined form.

5. The server according to claim 1, wherein the circuitry is configured to notify current position information of the predetermined area to the second user when the predetermined area moves while the second user is using the predetermined area.

6. The server according to claim 1, wherein the circuitry is configured to allow the second user and the first user to communicate with each other when the predetermined area moves while the second user is using the predetermined area.

7. A method, comprising:
   acquiring request information on a request for a use of a predetermined area, the predetermined area being owned by a first user, the first user permitting the use of the predetermined area, and the request being issued by a second user;
   issuing authentication information for locking and unlocking the predetermined area to the second user based on the request information; and
   permitting only unlocking of the predetermined area using the authentication information issued to the second user after the second user has unlocked and locked the predetermined area.

8. The method according to claim 7, further comprising prohibiting the locking and unlocking of the predetermined area by users other than the second user after the second user locks and unlocks the predetermined area.

9. The method according to claim 7, further comprising acquiring information on a permission of the use of the predetermined area from the first user, wherein the information at least includes a location of the predetermined area when the use of the predetermined area is permitted, a time at which the permission of the use starts, and a time at which the permission of the use ends.

10. The method according to claim 9, wherein the request information includes a use limitation for limiting use in a predetermined form.

11. The method according to claim 7, further comprising notifying current position information of the predetermined area to the second user when the predetermined area moves while the second user is using the predetermined area.

12. The method according to claim 7, further comprising allowing the second user and the first user to communicate with each other when the predetermined area moves while the second user is using the predetermined area.

13. A vehicle comprising:
    circuitry programmed to:
    acquire request information on a request for a use of a predetermined area in the vehicle, the predetermined area being owned by a first user, the first user permitting the use of the predetermined area, and the request being issued by a second user;
    issue authentication information for locking and unlocking the predetermined area to the second user based on the request information; and
    permit only unlocking of the predetermined area using the authentication information issued to the second user after the second user has unlocked and locked the predetermined area.

14. The vehicle according to claim 13, wherein the circuitry is configured to prohibit the locking and unlocking of the predetermined area by users other than the second user after the second user locks and unlocks the predetermined area.

15. The vehicle according to claim 13, wherein
    the circuitry is configured to acquire information on a permission of the use of the predetermined area from the first user, and
    the information at least includes a location of the vehicle when the use of the predetermined area is permitted, a time at which the permission of the use starts, and a time at which the permission of the use ends.

16. The vehicle according to claim 15, wherein the request information includes a use limitation for limiting use in a predetermined form.

17. The vehicle according to claim 13, wherein the circuitry is configured to notify current position information of the vehicle to the second user when the vehicle moves while the second user is using the predetermined area.

18. The vehicle according to claim 13, wherein the circuitry is configured to allow the second user and the first user to communicate with each other when the vehicle moves while the second user is using the predetermined area.

* * * * *